Feb. 7, 1950 W. J. LAMBERT 2,496,398
COMBINED RADIO AND INTERCOMMUNICATION SYSTEM
Filed July 13, 1945
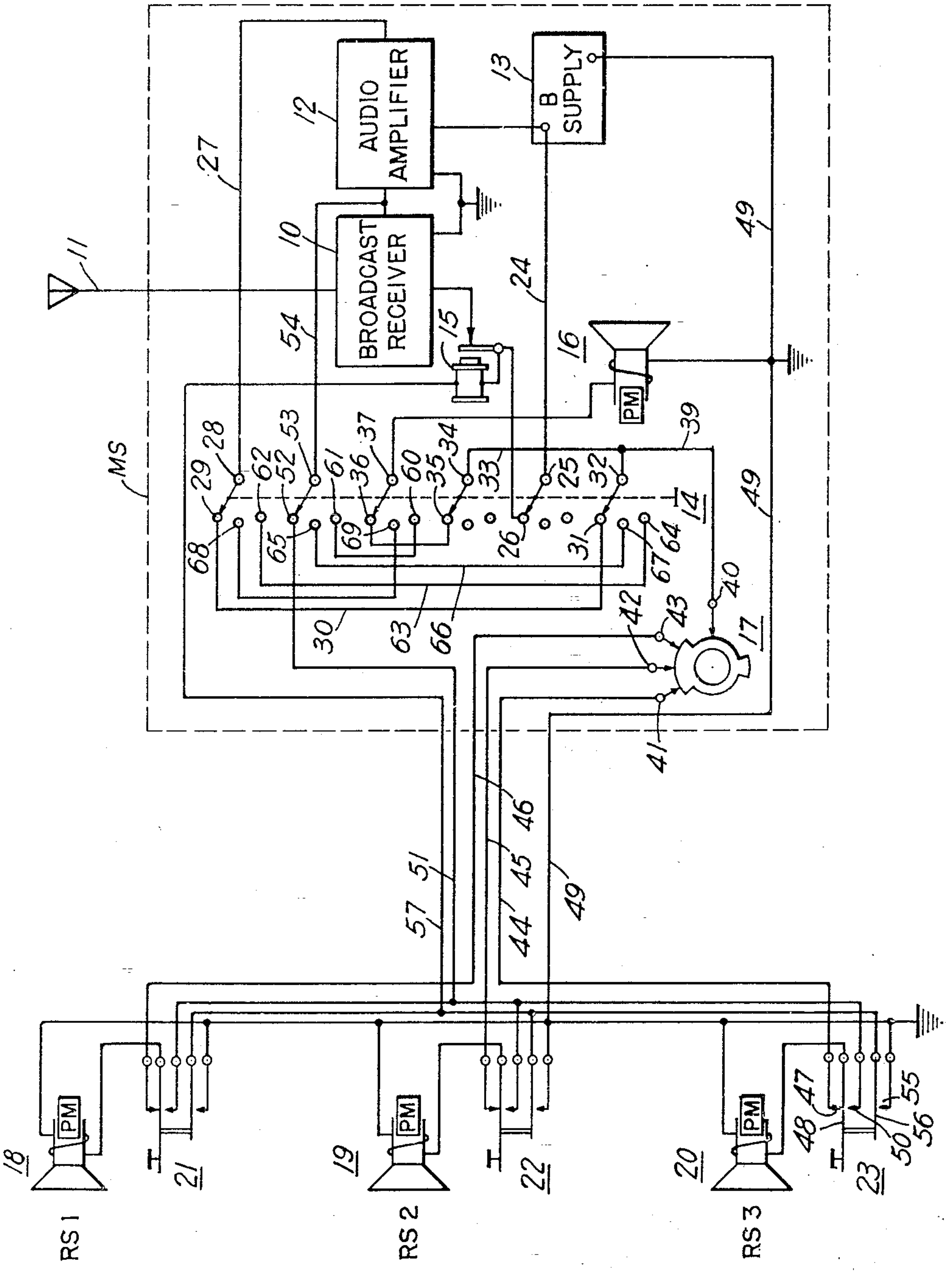
INVENTOR.
WILLIAM J. LAMBERT
BY E. W. Woodbury
ATTORNEY Patented Feb. 7, 1950 2,496,398

UNITED STATES PATENT OFFICE 2,496,398

COMBINED RADIO AND INTERCOMMUNICATION SYSTEM

William J. Lambert, North Hollywood, Calif., assignor to Bendix Aviation Corporation, South Bend, Ind., a corporation of Delaware Application July 13, 1945, Serial No. 604,874

5 Claims. (Cl. 179—2)

This invention relates to a combination radio broadcast receiver and intercommunicating telephone system.

Briefly, the system incorporates a master station at which a radio broadcast receiver is located, and a plurality of remote stations, each equipped with a microphone speaker unit, in combination with circuits and switches for providing either the reception of radio programs at the master and remote stations, or for telephone intercommunication between the master station and one or more of the remote stations.

A general object of the invention is to provide a practicable system that can be readily adjusted or controlled for use either for broadcast reception or for telephone intercommunication.

A more specific object of the invention is to provide a system of the type referred to in which a broadcast program is normally received at all of the stations, but in which the program can be interrupted at any station for telephone intercommunication between a remote station and the master station.

Another more specific object is to provide a system of the type referred to in which an operator at the master station can selectively control intercommunication in either direction between the master station and any one or all of the remote stations.

Still another specific object is to provide a system of the type referred to in which a common audio amplifier at the master station is employed either to amplify received radio programs or to amplify speech currents when the system is being used for telephone intercommunication purposes.

Other more specific objects and features of the invention will become apparent from the detailed description to follow of one embodiment of the invention as disclosed in the drawing.

Essentially, a system in accordance with the invention comprises a master station equipped with a radio broadcast receiving unit, an audio amplifying unit, a current supply unit, and a microphone-speaker, in combination with one or more remote stations, the equipment at each remote station consisting only of a microphone-speaker and a switch. The master station includes two control switches, one of which is simply a station-selecting switch for establishing communication between the master station and one or more of the remote stations.

The other switch, which may be referred to as a direction-control switch, has three positions, in one of which the broadcast receiver is energized to receive a broadcast program and deliver it to the speaker at the master station and to the speakers at one or more of the remote stations according to the setting of the station-selecting switch. In its second position, the direction-control switch disables the broadcast receiver and connects the local microphone-speaker to the output of the audio amplifier while connecting the input of the amplifier to one or more of the remote stations according to the setting of the station selecting switch. In its third position, the direction-control switch also disables the broadcast receiver, but connects the local microphone-speaker to the input of the audio amplifier while connecting the output thereof to one or more remote stations according to the setting of the station-selecting switch.

The switch at each remote station is provided for the sole purpose of enabling an operator at any remote station (regardless of position of the station selecting switch at the master) to disable the broadcast receiver and talk to the operator at the master station.

It will be observed from the foregoing brief description that the system provides for the normal reception of broadcast programs at one, or all, of the remote stations in the system, while making it possible for an operator at any station to interrupt the broadcast reception and use the system for intercommunication purposes.

A full understanding of the details of the system may be had from the following description with reference to the drawing in which the single figure is a schematic diagram of the apparatus and the circuits employed.

In the drawing, the apparatus enclosed within the broken line MS is located at a master station which is adapted to be used in cooperation with apparatus at three remote stations identified as RS1, RS2, and RS3.

The apparatus at the master station MS includes a conventional broadcast receiver, which may have a receiving antenna 11, and which is permanently connected to the input of an audio amplifier 12. The receiver 10 is conventional in all respects except that it does not have permanently connected to it a source of plate current. Instead, the plate current is shown supplied from a B-supply 13, which is adapted to be connected to the receiver 10 through contacts of a switch 14 and of a relay 15, the operation of which will be described later.

As previously indicated, the input of the audio amplifier is permanently connected to the output of the receiver 10, but it is also adapted to be connected to various microphone-speakers in the system through the switching arrangement to be described later. The output of the amplifier is likewise adapted to be switched to different microphone-speakers in the system. As shown, the audio amplifier 12 is permanently connected to the B-supply 13, since it is constantly energized during operation of the system.

The master station MS also includes a speaker-microphone 16 which may be of the permanent magnet dynamic type capable of either translating sound currents into sound, or sound into sound currents.

The only additional apparatus at the master station MS is the switch 14 hereinafter referred to as the direction-control switch, and a switch 17 hereinafter referred to as the station-selecting switch.

The equipment at each of the remote stations RS1, RS2, and RS3 includes simply a microphone-speaker 18, 19, or 20, and a switch 21, 22, or 23.

The various connections and the contacts of the switches will be described in connection with the description of operation which follows.

The system is shown in its normal condition, for reception of a program by the broadcast receiver 10, and the transmission of the program to all of the speakers in the system. Thus, it will be observed that the receiver 10 is energized from the B-supply 13 over a lead 24 and contacts 25 and 26 of the direction-control switch 14, and thence over the armature and back contact of the relay 15 to the receiver. The output of the receiver is delivered to the audio amplifier, where signal currents are amplified and delivered over a lead 27, contacts 28, and 29 of switch 14, a lead 30, contacts 31 and 32 of switch 14, thence over a lead 33 and contacts 34 and 35, and thence over contacts 36 and 37 of switch 14 to the microphone-speaker 16. The signal currents are also transmitted from contact 32 of switch 14 over a lead 39 to the master contact 40, and over all three contacts 41, 42, and 43, of switch 17, and thence over leads 44, 45, and 46 to the remote stations RS1, RS2, RS3, respectively. At the remote station RS3, the signal currents coming in over lead 44 pass over contacts 47 and 48 of the switch 23 to the microphone-speaker 20 and thence to the ground lead 49, completing the circuit. The circuits over the lead 45 to the speaker 19 at remote station RS2 and over the lead 46 to the speaker 18 at remote station RS1 can be similarly traced. It will be apparent, therefore, that under normal conditions the radio program received by the broadcast receiver 10 is delivered to all of the speakers at all of the stations.

If the operator at any one of the remote stations wishes to communicate with the operator at the master station MS, he can do so by actuating his switch 21, 22, or 23, as the case may be, and speaking into his microphone-speaker. Assuming that the operator at station RS3 actuates his switch 23, this disconnects his microphone-speaker 20 from the line 44 by interrupting the circuit at contact 47. At the same time, the microphone-speaker is connected over contacts 48 and 50 to a lead 51, which is common to all of the remote stations and extends to a contact 52 on the direction-control switch 14 at the master station MS. With the switch 14 in the position shown, connection is completed from contact 52 to contact 53 and thence over a lead 54 to the input of the audio amplifier 12. Actuation of the switch 23 at the remote station RS3 also applies ground over contacts 55 and 56 of switch 23 to a lead 57, which is also common to all of the remote stations and extends through the winding of the relay 15 at the master station MS to the armature of the relay 15, which, with the switch 14 in the position shown, is connected to the B-supply 13. Current, therefore, flows through the winding of relay 15 to open the armature of the relay away from its back contact, thereby silencing the broadcast receiver 10.

It is apparent, therefore, that following actuation of his switch 23, the operator at the remote station RS3 can speak into his microphone-speaker 20 and be heard over the microphone-speaker 16 at the master station. The operator at the remote station RS3 may ask the operator at the master station a question, which the operator at the master station can answer by moving his direction-control switch 14 into its lowermost position. This connects the microphone-speaker 16 over contacts 37, 60, 61, and 53 of switch 14 to the input of the audio amplifier, and connects the lead 27 from the output of the audio amplifier, over contacts 28, 62, lead 63 and contacts 64 and 32, to the lead 39 which is connected by the switch 17 to the three leads 44, 45, and 46 going to the remote stations. The operator at the remote station RS3 must, however, release his switch 23 in order to connect the line 44 with his microphone-speaker 20 over the contacts 47 and 48 of switch 23.

The procedure to be followed, therefore, when an operator at one of the remote stations wishes to signal the operator at the master station, is to actuate his switch (23 in the case of station RS3) to silence the radio receiver, speak his message into his microphone-speaker, and then release his switch 23 so that control of the direction of communication is transferred to the operator at the master station.

After the operator at the master station has spoken to the operator at the remote station, he can then condition the system for reception from the remote station by moving the switch 14 into its intermediate position. This connects the lead 54 going to the input of the audio amplifier 12, over contacts 53 and 65, lead 66 and contacts 67 and 32 of switch 14, to the lead 39 going to the station-selecting switch 17. At the same time, the lead 27 from the output of the audio amplifier 12 is connected, over contacts 28 and 68, and contacts 69 and 37 of switch 14, to the microphone-speaker 16, so that a circuit is completed for communication from the microphone-speaker at the remote station to the microphone-speaker at the master station.

It will be observed that the circuit from the B-supply 13 to the relay 15 is interrupted at the switch contact 25 whenever the switch 14 is in its intermediate or lower position, so that the broadcast receiver 10 can never be energized with the switch in either of these two positions, which are for intercommunication only.

As previously described, the switch 17 is shown in the position in which the lines 44, 45, and 46 going to all three remote stations are simultaneously connected to the lead 39 at the master station. Hence, during a conversation between any one of the remote stations and the master station, the other remote stations will hear the operator at the master station. However, if the operator at the master station so desires, he can actuate the station-selecting switch 17 to cut off any of the remote stations that he does not wish to talk to, since it will be apparent from the construction of switch 17 that it permits the connection of the lead 39 to any one or to all three of the contacts 41, 42, and 43.

The procedure whereby an operator at a remote station silences the radio and initiates intercommunication with the master station has been described. It is also possible for the operator at the master station to call any one or all of the remote stations by simply actuating the switch 14 into lowermost position to connect his microphone-speaker 16 to the input of the audio amplifier 12 and connect the output lead 27 of the audio amplifier to the lead 39. When he wishes to receive an answer from the remote station, he simply allows the switch 14 to return to its intermediate position.

It will be apparent from the foregoing description that the system of the invention is flexible in operation, permitting the initiation of calls by either the master station or the remote stations, while permitting the transmission of radio programs to any one or all of the remote stations when the system is not being used for intercommunication purposes. This effects considerable economy in equipment since the apparatus at each remote station is reduced to a speaker-microphone and a simple switch, and the equipment at the master station utilizes the same audio amplifier for both intercommunication and for radio reception.

It is to be understood that the circuit shown is purely schematic and that the apparatus need not be arranged exactly as shown. For example, the B-supply unit 13 might well be constructed integrally with the audio amplifier. In fact, in practice, it would often be desirable to combine the apparatus of the broadcast receiver, the audio amplifier 12, and B-supply 13 together with the microphone-speaker 16, the relay 15 and the switches 14 and 17 all in a single compact unit.

Various departures from the exact circuit shown can be made while still utilizing the advantages of the invention which is to be limited only to the extent set forth in the appended claims.

I claim:

1. A system of the type described comprising: a master station including a source of program sound, an audio amplifier the source of said program sound being connected to input of said audio amplifier, a source of current relay means connected to said current source for energizing said program source and thus applying program sound to the input of said amplifier, and a microphone-speaker; a plurality of remote stations each including a microphone-speaker; a plurality of lines one individual to each remote station extending therefrom to said master station; first, second and third auxiliary lines extending between said master station and all said remote stations; switch means at each remote station operable in a first position to connect the microphone-speaker at that station between said first auxiliary line and the line individual to that station and operable in a second position to connect the microphone-speaker at that station between said first and second auxiliary lines and connect said first auxiliary line to said third auxiliary line; a master conductor at said master station; first switch means at the master station operable to selectively connect said master conductor to any or all of said individual lines; second switch means at said master station movable into any one of three positions and operable in the first position to connect the output of said amplifier between said first auxiliary line and said master conductor, to the microphone-speaker at the master station and to connect said second auxiliary line to the input of said amplifier and to connect said relay means and said current source in series between said first and third auxiliary lines; said second switch when in its second position interrupting delivery of program sound from said source of program sound into the input of said amplifier, connecting the output of said amplifier to said microphone-speaker at the master station, and connecting the input of said amplifier between said master conductor and said first auxiliary line; said second switch when in its third position interrupting delivery of program sound from said source to the input of said amplifier connecting the input of said amplifier to said microphone-speaker at the master station, and connecting the output of said amplifier between said master conductor and said first auxiliary line.

2. A system of the type described comprising: a master station and a remote station; a source of program sound, an amplifier, and a microphone-speaker at the master station; a microphone-speaker at the remote station; remotely controlled means at the master station for controlling the supply of program sound to the input of said amplifier; means for connecting the output of said amplifier to the microphone-speaker at the master station; first, second, and third circuits extending from said master station to said remote station; means connecting said first circuit to said remotely controlled means at the master station; means connecting said second circuit to the input of said amplifier at the master station; means connecting said third circuit to the output of said amplifier at the master station; and switch means at the remote station having two positions, in one of which it connects said third circuit to the microphone-speaker at the remote station, and in the other of which it connects said second circuit to said microphone-speaker at the remote station and conditions said first circuit to actuate said remotely controlled means to interrupt the supply of program sound to the input of said amplifier.

3. A system of the type described comprising: a master station and a plurality of remote stations; a source of program sound, an amplifier, and a microphone-speaker at the master station; a microphone-speaker at each remote station; remotely controlled means at the master station for controlling the supply of program sound to the input of said amplifier; means for connecting the output of said amplifier to the microphone-speaker at the master station; first, second, and third circuits extending from said master station to said remote station; means connecting said first circuit to said remotely controlled means at the master station; means connecting said second circuit to the input of said amplifier at the master station; means connecting said third circuit to the output of said amplifier at the master station; and switch means at each remote station having two positions, in one of which it connects said third circuit to the microphone-speaker at the remote station, and in the other of which it connects said second circuit to said microphone-speaker at the remote station and conditions said first circuit to actuate said remotely controlled means to interrupt the supply of program sound to the input of said amplifier.

4. A system of the type described comprising: a master station and a remote station; a source of program sound, an amplifier and a microphone-speaker at the master station; a microphone-speaker at the remote station; remotely controlled means at the master station for controlling the supply of program sound to the input of said amplifier; first, second, and third circuits extending from said master station to said remote station; switch means at said master station movable into any one of three positions and operable in the first position to connect the output of said amplifier to said third circuit and to the microphone-speaker at the master station, and operatively connect said remotely controlled means with said first circuit; said switch being operable in its second position to interrupt delivery of program sound to the input of said amplifier, connect the output of the said amplifier to said microphone-speaker at the master station, and connect the input of said amplifier to said third circuit; said switch being operable in its third position to interrupt delivery of program sound to the input of said amplifier, connect the input of said amplifier to said microphone-speaker at the master station, and connect the output of said amplifier to said third circuit; and switch means at the remote station having two positions, in one of which it connects said third circuit to the microphone-speaker at the remote station, and in the other of which it connects said second circuit to said microphone-speaker at the remote station and conditions said first circuit to actuate said remotely controlled means to interrupt the supply of program sound to the input of said amplifier.

5. A combination as claimed in claim 3 in which said third circuit comprises a plurality of circuits each individual to a respective remote station, each individual circuit extending from its respective remote station to said master station, and switch means at said master station for selectively connecting any or all of said individual lines to the remainder of the circuits at the master station.

WILLIAM J. LAMBERT.

REFERENCES CITED

The following references are of record in the file of this patent:

UNITED STATES PATENTS

| Number | Name | Date |
|---|---|---|
| 1,922,415 | Bank | Aug. 15, 1933 |
| 2,054,933 | Frazier | Sept. 22, 1936 |
| 2,164,960 | Stockton et al. | July 4, 1939 |